US010079794B2

(12) United States Patent
Saxena et al.

(10) Patent No.: US 10,079,794 B2
(45) Date of Patent: Sep. 18, 2018

(54) GENERATING A CONTENT ITEM BASED ON USER INFORMATION MAINTAINED BY A FIRST ONLINE SYSTEM FOR PRESENT ON A SECOND ONLINE SYSTEM

(71) Applicant: Facebook, Inc., Menlo Park, CA (US)

(72) Inventors: Sanchan Sahai Saxena, Milpitas, CA (US); Mohit Rajani, San Francisco, CA (US); David S. Gross-Baser, Mountain View, CA (US); Lukas Camra, San Francisco, CA (US); Ed Ignatius Tanghal Salvana, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 140 days.

(21) Appl. No.: 15/159,727

(22) Filed: May 19, 2016

(65) Prior Publication Data
US 2017/0339092 A1 Nov. 23, 2017

(51) Int. Cl.
*H04L 12/58* (2006.01)
*H04L 29/08* (2006.01)
*H04L 29/06* (2006.01)

(52) U.S. Cl.
CPC .............. *H04L 51/32* (2013.01); *H04L 51/10* (2013.01); *H04L 67/306* (2013.01)

(58) Field of Classification Search
USPC .................................................. 709/206, 204
See application file for complete search history.

(56) References Cited

U.S. PATENT DOCUMENTS

| | | | | |
|---|---|---|---|---|
| 7,162,471 B1* | 1/2007 | Knight | ............... | G06F 17/30864 707/750 |
| 9,894,560 B2* | 2/2018 | Li | ............ | H04W 28/12 |
| 2009/0292762 A1* | 11/2009 | Mettala | .............. | G06Q 30/02 709/203 |
| 2010/0312820 A1* | 12/2010 | Goffinet | .............. | G06Q 30/02 709/203 |
| 2012/0116973 A1* | 5/2012 | Klein | ................... | G06Q 20/108 705/44 |
| 2012/0231438 A1* | 9/2012 | Fakhrai | .................... | G09B 7/00 434/350 |
| 2014/0036785 A1* | 2/2014 | Li | ....................... | H04L 12/1407 370/328 |
| 2014/0351346 A1* | 11/2014 | Barton | .................... | H04L 51/00 709/206 |
| 2015/0379582 A1* | 12/2015 | Jain | ..................... | G06Q 30/0269 705/14.66 |

(Continued)

*Primary Examiner* — Jude Jean Gilles
(74) *Attorney, Agent, or Firm* — Fenwick & West LLP (57) ABSTRACT

A first online system allows a user to create content items for presentation in a second online system without having an account in the second online system. The first online system maintains identifying information associated with users of the first online system. The first online system may also maintain a set of permissions identifying users of the first online system authorized to create content items associated with each user of the first online system. Based on the information, the first online system enables its users to create content items for presentation to users of the second online system without requiring the users to create accounts on the second online system. The content items may include one or more types of objects maintained by the first online system that help identify the user associated with the content item.

25 Claims, 5 Drawing Sheets (56) References Cited

U.S. PATENT DOCUMENTS

| | | | |
|---|---|---|---|
| 2016/0149850 A1* | 5/2016 | Pan | H04L 51/32 |
| | | | 709/206 |
| 2016/0205208 A1* | 7/2016 | Yang | H04L 67/22 |
| | | | 709/224 |
| 2016/0226884 A1* | 8/2016 | Wiley | H04L 63/102 |
| 2016/0241567 A1* | 8/2016 | Wiley | H04L 67/10 |

* cited by examiner

GENERATING A CONTENT ITEM BASED ON USER INFORMATION MAINTAINED BY A FIRST ONLINE SYSTEM FOR PRESENT ON A SECOND ONLINE SYSTEM

BACKGROUND

This disclosure relates generally to online systems, and more specifically to allowing a user of a first online system to create content items for presentation in a second online system without having an account in the second online system.

An online system allows its users to connect and communicate with other online system users. Users create profiles on an online system that are tied to their identities and include information about the users, such as interests and demographic information. The users may be individuals or entities such as corporations or charities. Because of the popularity of online systems and the significant amount of user-specific information maintained by online systems, an online system provides an ideal forum for allowing users to share content by creating content items for presentation to additional online system users. For example, users may share photos or videos they have uploaded by creating content items that include the photos or videos that are presented to additional users.

Conventionally, content items generated by online systems include information describing the users creating the content items based on user identifying information maintained by the online systems that is stored in association with the users' accounts. For example, a content item created by a user after logging into their user account includes the user's name and profile picture, as well as other content associated with the user maintained by the online system that is stored in association with the user's profile or account in the online system. However, users are limited to creating content items for presentation to users on the same online system on which they have an account. For example, since the user in the previous example has an account maintained by the online system, the online system was able to generate the content item using the user identifying information and other content associated with the user maintained by the online system, but would have been unable to do so if the user did not have a user account on the online system. Requiring users to create an account on each of multiple online systems in order to share content on the online systems is inconvenient and may discourage users from sharing content on multiple online systems. Once users have created accounts on multiple online systems, they also may be required to manage their accounts in order to share content (e.g., by updating them and uploading content to be shared). Moreover, assessing the performance of each content item requires an assessment to be made for each online system on which the content item was created.

SUMMARY

A first online system allows a user to create content items for presentation in a second online system without having an account in the second online system. The first online system maintains identifying information associated with users of the first online system. The first online system may also maintain a set of permissions identifying users of the first online system authorized to create content items associated with each user of the first online system. Based on the information, the first online system enables its users to create content items for presentation to users of a second online system without requiring the users to create accounts on the second online system. For example, the content items incorporate user identifying information maintained by the first online system that help identify a user associated with each content item. Furthermore, content items may be generated for presentation on the second online system such that they are similar in appearance to content items associated with users of the second online system that have accounts in the second online system.

In various embodiments, the users for which the first online system maintains information include entities (e.g., organizations or advertisers), thus allowing entities to establish their presence on the first online system and to create content items (e.g., advertisements) for presentation to users of a second online system. For example, if an entity requests to create a content item on the first online system for presentation to users of the second online system, the first online system generates the content item using information stored in a user account for the entity maintained by the first online system.

In such embodiments, the first online system may store a set of permissions identifying users of the first online system associated with each entity that are authorized to create content items on behalf of the entity. The permissions may be stored in connections established between users and entities on the first online system. For example, information stored in connections maintained by the first online system between a retail store and users of the first online system that are employees of the store describe the users' employee titles, where certain titles indicate that a user is authorized to create content items on behalf of the store (e.g., marketing executive), while other titles indicate that a user is not authorized to do so (e.g., sales clerk).

Users that are authorized to create content items on behalf of an entity may be authorized to create content items including or describing a subset of objects maintained by the first online system associated with the entity. For example, a set of permissions associated with a user that is an administrator of certain pages associated with an organization authorize the user to create content items including information from those pages, but do not authorize the user to create content items including information from pages associated with the organization of which the user is not an administrator. The first online system may also confirm whether a user of the first online system is authorized to create content items on behalf of an entity in other ways. For example, to request to create a content item associated with an entity, a user of the first online system must first log into an account associated with the entity maintained by the first online system using login credentials associated with the entity (e.g., login name and password).

Elements included in a content item may include one or more types of objects maintained by the first online system that help identify the user or entity associated with the content item. For example, if a user that is an administrator of a page maintained by the first online system that is associated with an organization requests to create a content item on behalf of the organization for presentation to users of a second online system and specifies the page in the request, the first online system generates the content item with a name and profile picture associated with the page. In some embodiments, an interactive element included in a content item may enable a viewing user of the content item to take an action associated with the content item (e.g., purchase tickets for a movie featured in the content item). Examples of types of objects that may be specified in a request to create a content item include a page associated with a user/entity, an image associated with the user/entity, a video associated with the user/entity, etc.

The first online system may track information describing interactions with the content items by users of a second online system on which the content items are presented, enabling users of the first online system to obtain information describing performance of the content items on the second online system or across multiple additional online systems. For example, if the first online system generates a content item associated with a user of the first online system for presentation to users of three additional online systems, the first online system may subsequently determine metrics associated with the content item (e.g., a number of users of one or more of the additional online systems that expressed a preference for the content item, shared the content item, etc.) during a time interval specified by the user. In the previous example, the first online system may present the metrics to the user of the first online system that requested to create the content item (e.g., upon request by the user).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
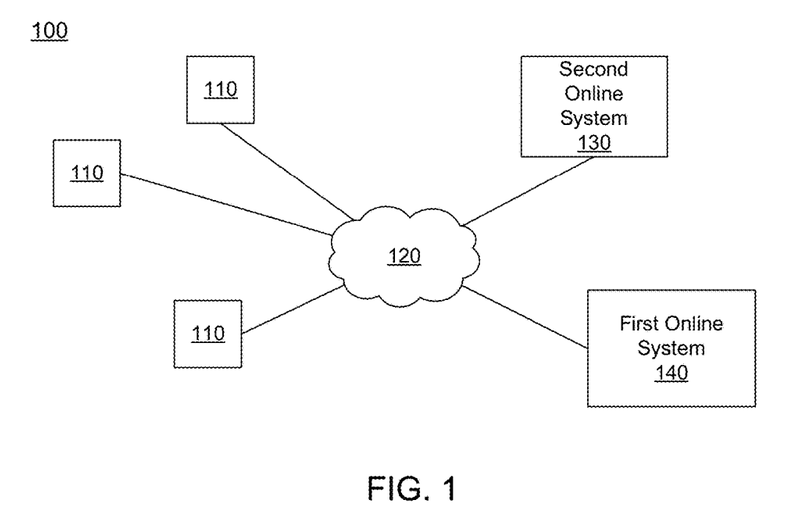
FIG. 1 is a block diagram of a system environment in which an online system operates, in accordance with an embodiment.

FIG. 1 is a block diagram of a system environment 100 for an first online system 140. The system environment 100 shown by FIG. 1 comprises one or more client devices 110, a network 120, a first first online system 140, and a second online system 130. In alternative configurations, different and/or additional components may be included in the system environment 100. The embodiments described herein may be adapted to online systems that are not online systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the first online system 140. For example, a client device 110 executes a browser application to enable interaction between the client device 110 and the first online system 140 via the network 120. In another embodiment, a client device 110 interacts with the first online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In one embodiment, the second online system 130 is a third party system and may be coupled to the network 120 for communicating with the first online system 140, which is further described below in conjunction with FIG. 2. In one embodiment, a second online system 130 is an application provider communicating information describing applications for execution by a client device 110 or communicating data to client devices 110 for use by an application executing on the client device 110. In other embodiments, a second online system 130 provides content or other information for presentation via a client device 110. A second online system 130 may also communicate information to the first online system 140, such as advertisements, content, or information about an application provided by the second online system 130.

Figure 2:
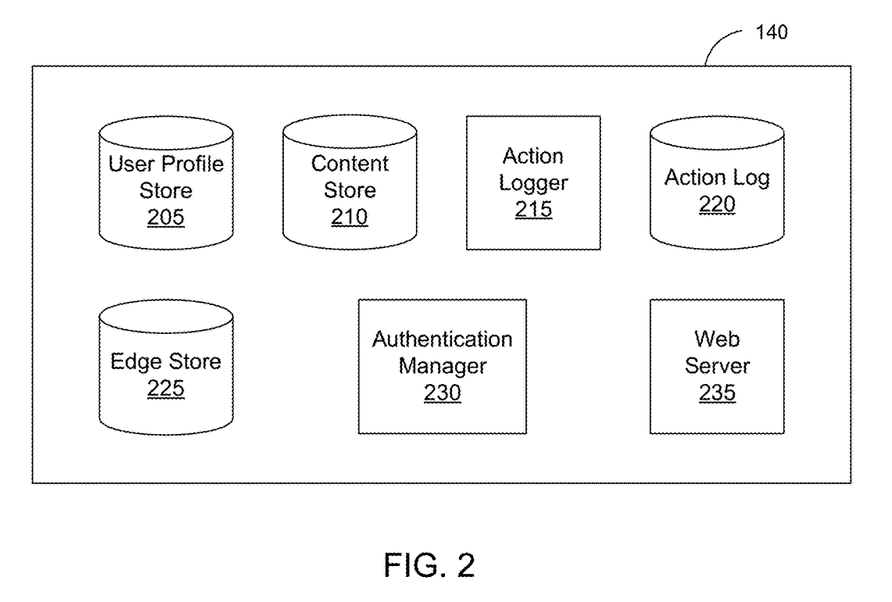
FIG. 2 is a block diagram of an online system, in accordance with an embodiment.

FIG. 2 is a block diagram of an architecture of the first online system 140. The first online system 140 shown in FIG. 2 includes a user profile store 205, a content store 210, an action logger 215, an action log 220, an edge store 225, an authentication manager 230, and a web server 235. In other embodiments, the first online system 140 may include additional, fewer, or different components for various applications. Conventional components such as network interfaces, security functions, load balancers, failover servers, management and network operations consoles, and the like are not shown so as to not obscure the details of the system architecture.

Each user of the first online system 140 is associated with a user profile, which is stored in the user profile store 205. A user profile includes declarative information about the user that was explicitly shared by the user and may also include profile information inferred by the first online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

In some embodiments, the user profile store 205 includes information describing permissions granted to users of the first online system 140 that are authorized to create content items associated with an additional user (e.g., a "subject user"). For example, permissions stored in the user profile store 205 in association with a profile of an entity identify users of the first online system 140 authorized to create content items on behalf of the entity. As an additional example, permissions are stored in the user profile store 205 in association with profiles of users of the first online system 140, where the permissions identify an entity of the first online system 140 on whose behalf the users are authorized to create content items.

While user profiles in the user profile store 205 are frequently associated with individuals, allowing individuals to interact with each other via the first online system 140, user profiles may also be stored for entities such as businesses or organizations. This allows an entity to establish a presence on the first online system 140 for connecting and exchanging content with other online system users. The entity may post information about itself, about its products or provide other information to users of the first online system 140 using a brand page associated with the entity's user profile. Other users of the first online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the first online system 140, events, groups or applications. In some embodiments, objects are received from third-party applications or third-party applications separate from the first online system 140. In one embodiment, objects in the content store 210 represent single pieces of content, or content "items." Hence, online system users are encouraged to communicate with each other by posting text and content items of various types of media to the first online system 140 through various communication channels. This increases the amount of interaction of users with each other and increases the frequency with which users interact within the first online system 140.

The action logger 215 receives communications about user actions internal to and/or external to the first online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the first online system 140 to track user actions on the first online system 140, as well as actions on the second online system 130 that communicate information to the first online system 140. Users may interact with various objects on the first online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the first online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the first online system 140 as well as with other applications operating on the first online system 140. In some embodiments, data from the action log 220 is used to infer interests or preferences of a user, augmenting the interests included in the user's user profile and allowing a more complete understanding of user preferences.

The action log 220 may also store user actions taken on a second online system 130, such as an external website, and communicated to the first online system 140. For example, an e-commerce website may recognize a user of an first online system 140 through a social plug-in enabling the e-commerce website to identify the user of the first online system 140. Because users of the first online system 140 are uniquely identifiable, e-commerce websites, such as in the preceding example, may communicate information about a user's actions outside of the first online system 140 to the first online system 140 for association with the user. Hence, the action log 220 may record information about actions users perform on a second online system 130, including webpage viewing histories, advertisements that were engaged, purchases made, and other patterns from shopping and buying.

In one embodiment, the edge store 225 stores information describing connections between users and other objects on the first online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the first online system 140, such as expressing interest in a page on the first online system 140, sharing a link with other users of the first online system 140, and commenting on posts made by other users of the first online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the first online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

In various embodiments, the edge store 225 includes a set of permissions granted to users of the first online system 140 that are authorized to create content items associated with a subject user (e.g., an entity) of the first online system 140. For example, the edge store 225 includes information describing a permission associated with a user of the first online system 140, where the permission indicates that the user is permitted to create content items on behalf of an entity that has created an account on the first online system 140. As an additional example, the edge store 225 includes information describing multiple permissions associated with an entity, where the permissions identify multiple users of the first online system 140 that are permitted to create content items on behalf of the entity. The permissions may be stored in connections established between users and entities on the first online system 140. Multiple permissions granted to a user by an entity may be stored as a single edge in the edge store 225, in one embodiment. Alternatively, each permission granted to a user by an entity is stored as a separate edge.

In some embodiments, information stored in connections between users of the first online system 140 describes relationships between the users that are associated with various permissions related to the users. For example, information stored in connections maintained by the first online system 140 between a restaurant and users of the first online system 140 that are employees of the restaurant describe the users' employee titles, where certain titles (e.g., head of marketing) indicate that a user is authorized to create content items (e.g., advertisements) on behalf of the store, while other titles indicate that a user is not authorized to do so (e.g., hostess). Information describing connections between users may be stored in the user profile store 205, or the user profile store 205 may access the edge store 225 to determine connections between users. In one embodiment, permissions authorizing users to create content items associated with entities describe a set of objects maintained by the first online system 140 associated with the entity. For example, a set of permissions associated with a user that is an administrator of certain pages associated with an organization authorize the user to create content items including information from those pages, but do not authorize the user to create content items including information from pages associated with the organization of which the user is not an administrator.

A permission may be associated with a specified time interval during which a user satisfying criteria specified by the permission is authorized to create a content item associated with a subject user. For example, a permission authorizes a user having an indirect connection to an entity on the first online system 140 to perform an action associated with the permission during a 24-hour time interval; once the 24 hours have elapsed, the permission is revoked. A time interval specified by a permission may be determined or modified by the subject user associated with the content item to be created.

The edge store 225 also stores information about edges, such as affinity scores for objects, interests, and other users. Affinity scores, or "affinities," may be computed by the first online system 140 over time to approximate a user's interest in an object or in another user in the first online system 140 based on the actions performed by the user. A user's affinity may be computed by the first online system 140 over time to approximate a user's interest in an object, a topic, or another user in the first online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The authentication manager 230 determines whether a requesting user requesting to perform an action associated with one or more users is authorized to perform the action. In various embodiments, the authentication manager 230 determines whether a requesting user of a first online system 140 is authorized to create a content item associated with a subject user of the first online system 140 for presentation to users of a second online system 130. The authentication manager 230 may determine whether one or more permissions maintained by the first online system 140 authorize the requesting user to create the content item associated with the subject user. For example, if a requesting user of the first online system 140 requests to create a content item associated with an organization on the first online system 140 for presentation to users of a second online system 130, the authentication manager 230 determines whether the requesting user is authorized to create the content item based on one or more permissions maintained by the first online system 140 stored in association with profile information of the requesting user, profile information of the organization, or both.

The authentication manager 230 may also determine whether a requesting user is authorized to create a content item associated with a subject user based on a connection between the requesting user and the subject user maintained by the first online system 140. In one embodiment, the authentication manager 230 may determine whether a connection between the requesting user and the subject user maintained by the first online system 140 is sufficient to authorize the requesting user to create the content item associated with the subject user. A connection may be evaluated based on information including the existence of one or more edges between the requesting user and the subject user maintained by the first online system 140. For example, if a requesting user of the first online system 140 requests to create a content item associated with an entity on the first online system 140 for presentation to users of a second online system 130, the authentication manager 230 determines whether the requesting user is authorized to create the content item based the existence of on one or more connections maintained by the first online system 140 between the requesting user and the organization.

The authentication manager 230 may also evaluate a connection based on the type of connection between the requesting user and the subject user maintained by the first online system 140. The authentication manager 230 may evaluate a connection based on whether the requesting user or subject user requested to establish the connection, whether the users are directly or indirectly connected to each other, etc. For example, if an advertising manager of an organization is directly connected to the organization and an assistant advertising manager is directly connected to the advertising manager, but is only indirectly connected to the organization via the advertising manager, if the assistant advertising manager requests to create content items associated with the organization, the authentication manager 230 may determine whether the assistant advertising manager is authorized to do so based on information stored in the connection between the advertising manager and the assistant advertising manager and information stored in the connection between the advertising manager and the organization. Additionally, the authentication manager 230 may evaluate a connection between the requesting user and the subject user maintained by the first online system 140 based on information stored in the connection. For example, information stored in a connection between the requesting user and subject user may indicate a type of relationship between the users (e.g., employer-employee), include information describing one or more permissions granted by the subject user to the requesting user, etc.

In some embodiments, the authentication manager 230 determines whether a requesting user is authorized to create a content item associated with a subject user based on login credentials associated with the requesting user. For example, to request to create a content item associated with an entity, a requesting user of the first online system 140 must first log into an account associated with the entity maintained by the first online system 140 using login credentials associated with the entity (e.g., login name and password). The authentication manager 230 may also determine whether the requesting user of the first online system 140 is authorized to create a content item associated with a subject user of the first online system 140 for presentation to users of multiple additional online systems. For example, if a requesting user of the first online system 140 requests to create a content item associated with an entity for presentation to users of a second, third, and fourth online system, the authentication manager 230 determines whether permissions maintained by the first online system 140 authorize the requesting user to create the content item for presentation to users of the specified online systems. As an additional example, if a requesting user of the first online system 140 requests to create a content item associated with an entity for presentation to users of one or more additional online systems, the authentication manager 230 identifies additional online systems on which a content item generated by the requesting user and associated with the entity may be presented based on a set of permissions granted to the requesting user by the entity and presents the additional online systems that are identified as the only options available to the requesting user for which to generate the content item. The authentication manager 230 is further described below in conjunction with FIG. 3.

The web server 235 links the first online system 140 via the network 120 to the one or more client devices 110, as well as to the second online system 130 and/or one or more third party systems. The web server 235 serves web pages, as well as other content, such as JAVA®, FLASH®, XML and so forth. The web server 235 may receive and route messages between the first online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Generating a Content Item for Display on an Online System

Figure 3:
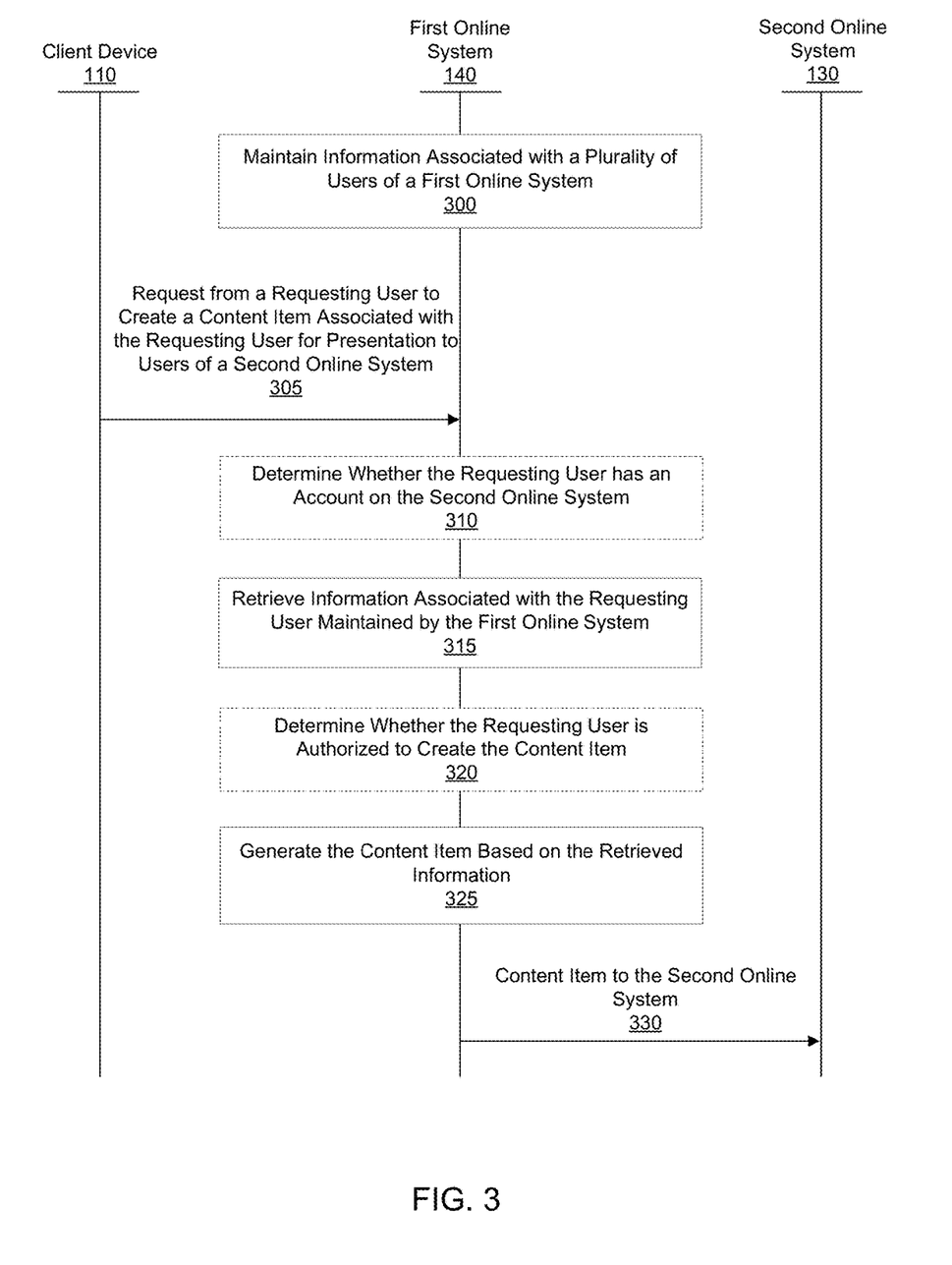
FIG. 3 is an interaction diagram of a method for allowing a user of a first online system to generate a content item for presentation in a second online system without having an account in the second online system, in accordance with an embodiment.

FIG. 3 is an interaction diagram of a method for allowing a user of a first online 140 system to generate a content item for presentation in a second online system 130 without having an account in the second online system 130 according to one embodiment. In other embodiments, the method may include different and/or additional steps than those shown in FIG. 3. Additionally, steps of the method may be performed in a different order than the order described in conjunction with FIG. 3.

The first online system 140 maintains 300 user information associated with a plurality of users of the first online system 140. In various embodiments, the users for which the first online system 140 maintains 300 information include entities. For example, the first online system 140 maintains 300 information associated with organizations, charities, companies, or advertisers. The user information includes information describing an identity of each user in the first online system 140. Examples of user information include a name of a user, a profile associated with the user, an image associated with the user, a page associated with the user, login credentials associated with the user, or any other suitable information describing an identity of a user of the first online system 140. The user information may also include additional types of information associated with each user in the first online system 140. For example, a user account for a particular user is associated with information describing the user that is stored in the user profile store 205 (e.g., user name, demographic information, interests, etc.), information describing objects to which the user is connected on the first online system 140 that is stored in the edge store 225 and/or content store 210 (e.g., other users, pages of which the user is an administrator, photographs in which the user is tagged, etc.), and any other types of suitable content associated with the user.

Additionally, the user information may include one or more permissions, where each permission identifies one or more users of the first online system 140 authorized to perform one or more actions associated with a user of the first online system 140 (e.g., an entity). The permissions may be associated with one or more objects associated with the user of the first online system 140 maintained 300 by the first online system 140. Examples of such objects include a uniform resource locator associated with a system external to the first online system 140, a page of information, an application, an event, an image, a video, or any other suitable object associated with a user of the first online system 140. The user profile store 205 may store information describing permissions granted to users of the first online system 140 that are authorized to create content items associated with a subject user. The permissions may also be stored in connections established between users and entities on the first online system 140 in the edge store 225, as described above. For example, information stored in connections maintained 300 by the first online system 140 between a charity and users of the first online system 140 that are affiliated with the charity describe the users' positions within the charity, where certain positions indicate that a user is authorized to create content items on behalf of the charity (e.g., historian), while other titles indicate that a user is not authorized to do so (e.g., volunteer driver).

The first online system 140 receives 305 a request from a client device 110 of a requesting user of the first online system 130 to generate a content item associated with the requesting user for presentation to users of a second online system 130. For example, the first online system 140 receives 305 a request from a user to create a content item for presentation to users of the second online system 130 describing a photograph that the user previously uploaded to the first online system 140. In some embodiments, the requesting user is associated with an entity. For example, the first online system 140 receives 305 a request to create a content item associated with an entity from an administrator of a page maintained by the first online system 140 for the entity. The request to create a content item may be received 305 by the first online system 140 directly from a user of the first online system 140 (e.g., via an interface generated by the first online system 140). Alternatively, the request may be communicated to the first online system 140 via a second online system 130 on which the content item is to be presented.

Figure 4:
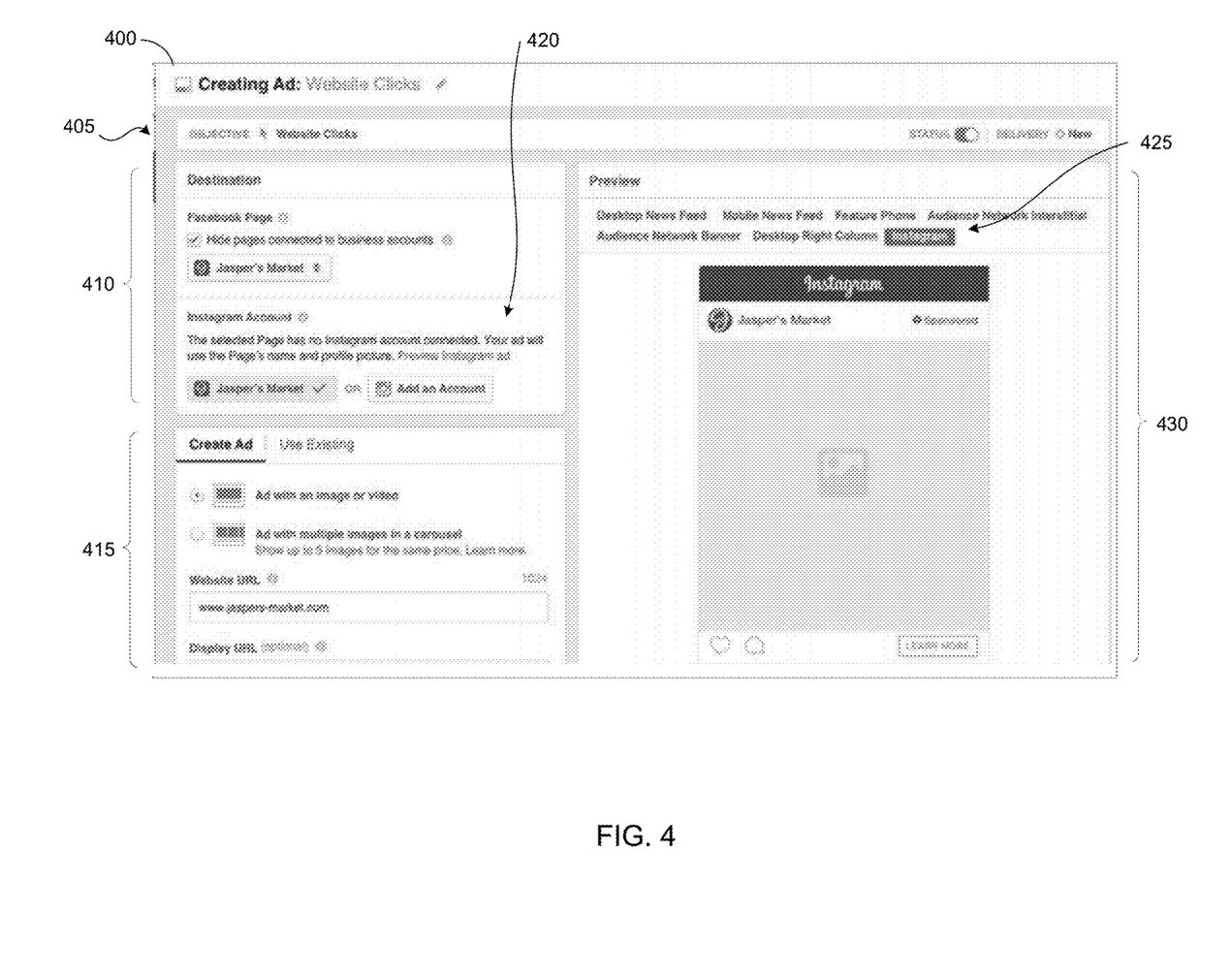
FIG. 4 is an example interface for allowing a user of a first online system to generate content items for presentation in a second online system without having an account in the second online system, in accordance with an embodiment.

FIG. 4 depicts an example interface 400 for allowing a user of the first online system 140 to generate content items for presentation in the second online system 130. The first online system 140 may allow the requesting user to create a content item (e.g., an advertisement) for presentation to users of the second online system 130 by receiving 305 a request to create the content items via a user interface 400. The interface 400 may allow the requesting user to provide various inputs used to generate the content item. In various embodiments, the first online system 140 allows the requesting user to specify an objective of the content item and user information maintained 300 by the first online system 140 to include in the content item, which may include one or more objects associated with the requesting user maintained 300 by the first online system 140.

Referring again to FIG. 3, the first online system may determine 310 whether the requesting user has an account in the second online system 130. For example, the first online system 140 submits a query to the second online system 130 to determine 310 the existence of a user account in the second online system 130 associated with an email address, phone number, or other unique identifier associated with the requesting user. Upon receiving 305 the request and determining 310 that the requesting user does not have an account in the second online system 130, the first online system 140 retrieves 315 information describing the identity of the requesting user. For example, the first online system 140 retrieves 315 information describing the identity of the requesting user from the user information maintained 300 by the first online system 140 in the user profile store 205.

The first online system 140 may determine 320 whether the requesting user is authorized to create the content item (e.g., if the content item is associated with a user of the first online system 140 other than the requesting user). The first online system 140 makes this determination 320 based at least in part on one or more permissions associated with the requesting user using the authentication manager 230, as described above. The authentication manager 230 may determine 320 whether the requesting user is authorized to create the content item based on one or more permissions maintained 300 by the first online system 140 stored in the user profile store 205 in association with profile information of the requesting user, profile information of the organization, or both. Alternatively, the authentication manager 230 may determine 320 whether a connection between the requesting user and the subject user maintained 300 by the first online system 140 is sufficient to authorize the requesting user to create the content item associated with the subject user. For example, information describing a connection between the requesting user and subject user may be retrieved from the edge store 225 and evaluated based on the existence of one or more edges between the requesting user and the subject user maintained 300 by the first online system 140, based on the type of connection between the requesting user and the subject user maintained 300 by the first online system 140 (e.g., which user requested to establish the connection, whether the connection is direct or indirect, etc.), and/or based on information stored in an edge between the requesting user and the subject user maintained 300 by the first online system 140.

In some embodiments, the authentication manager 230 determines 320 whether the requesting user is authorized to create the content item based on login credentials associated with the requesting user. For example, the first online system 140 requires the requesting user to provide login credentials associated with an entity (e.g., username and password) before allowing the requesting user to submit a request to create a content item associated with the entity. The authentication manager 230 may also determine 320 whether the requesting user of the first online system 140 is authorized to create a content item associated with a subject user of the first online system 140 for presentation to users of multiple additional online systems (i.e., in addition to the second online system 130, a third online system, a fourth online system, etc.). In embodiments where the first online system 140 determines 320 whether the requesting user is authorized to create the content item, the content item is generated 325 responsive to determining 320 that the requesting user is authorized to create the content item.

The first online system 140 generates 325 the content item including the information describing the identity of the requesting user in the first online system 140. The first online system 140 generates 325 a content item that includes elements that identify the user. For example, in response to determining 310 that the user does not have an account in the second online system 130, the first online system 140 generates 325 a content item with the user's name and profile picture. The content item may be generated 325 based at least in part on one or more inputs received from the requesting user (e.g., inputs identifying one or more objects to be included in the content item). For example, if the requesting user in the previous example provides an input identifying a photograph to include in the content item, the content item also includes an image of the photograph that is presented in conjunction with a time the photograph was uploaded and a caption for the photograph provided by the requesting user.

Referring again to FIG. 4, a requesting user may also specify an objective of maximizing website clicks 405, a destination of the content item 410 (e.g., one or more pages maintained 300 by the first online system 140 or second online system 130 associated with user accounts of the requesting user), one or more images or videos associated with the requesting user, and a website URL associated with the requesting user 415. In this example, since the requesting user does not have an account in the second online system 130, the user interface 400 may indicate this and provide an option for the requesting user to create an account 420 in the second online system 130 but allow the requesting user to proceed with creating the content item without creating an the account in the second online system 130. The interface may also describe the context 425 in which the content item will be presented by the second online system 130 and provide a preview of the content item to be generated 430 as it will appear on the second online system 130.

Referring back to FIG. 3, the first online system 140 then communicates 330 the content item to the second online system 130 specified by the requesting user. In some embodiments, the first online system 140 may communicate 330 the content item to one or more additional online systems as well (e.g., a third or fourth online system). The content item may allow a viewing user of the content item to perform an action associated with the content item. For example, if a content item is generated 325 for an online retailer and a viewing user of the second online system 130 clicks on hyperlinked text of the name of the retailer, the user is taken to a website for the retailer. Such features of the content item may specified by the requesting user in the user interface 400 and described in the preview of the content item to be generated 430, as described above in FIG. 4.

Figure 5:
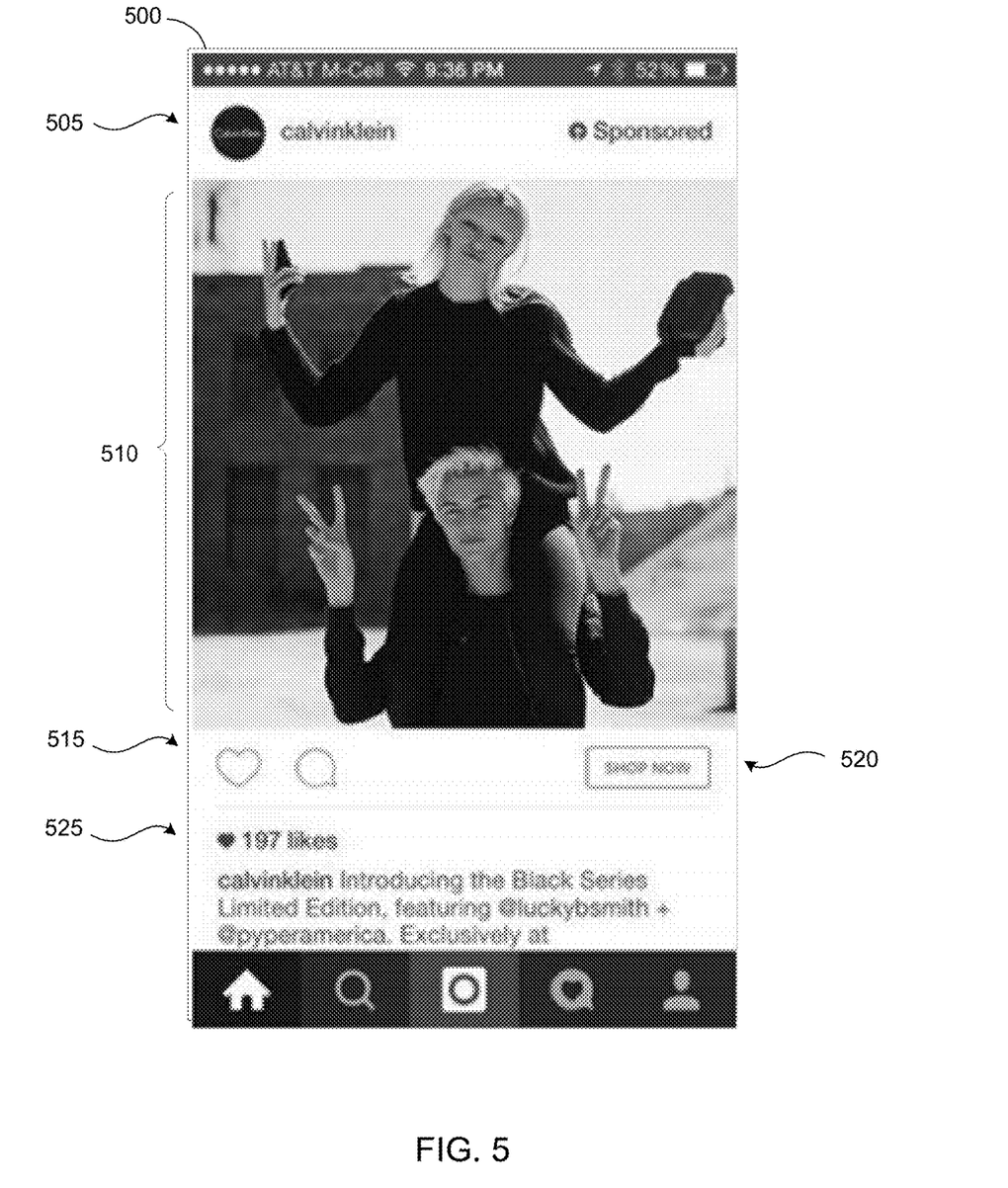
FIG. 5 is an example content item associated with a user generated for presentation in a second online system with a user account in the second online system, in accordance with an embodiment.
Figure 6:
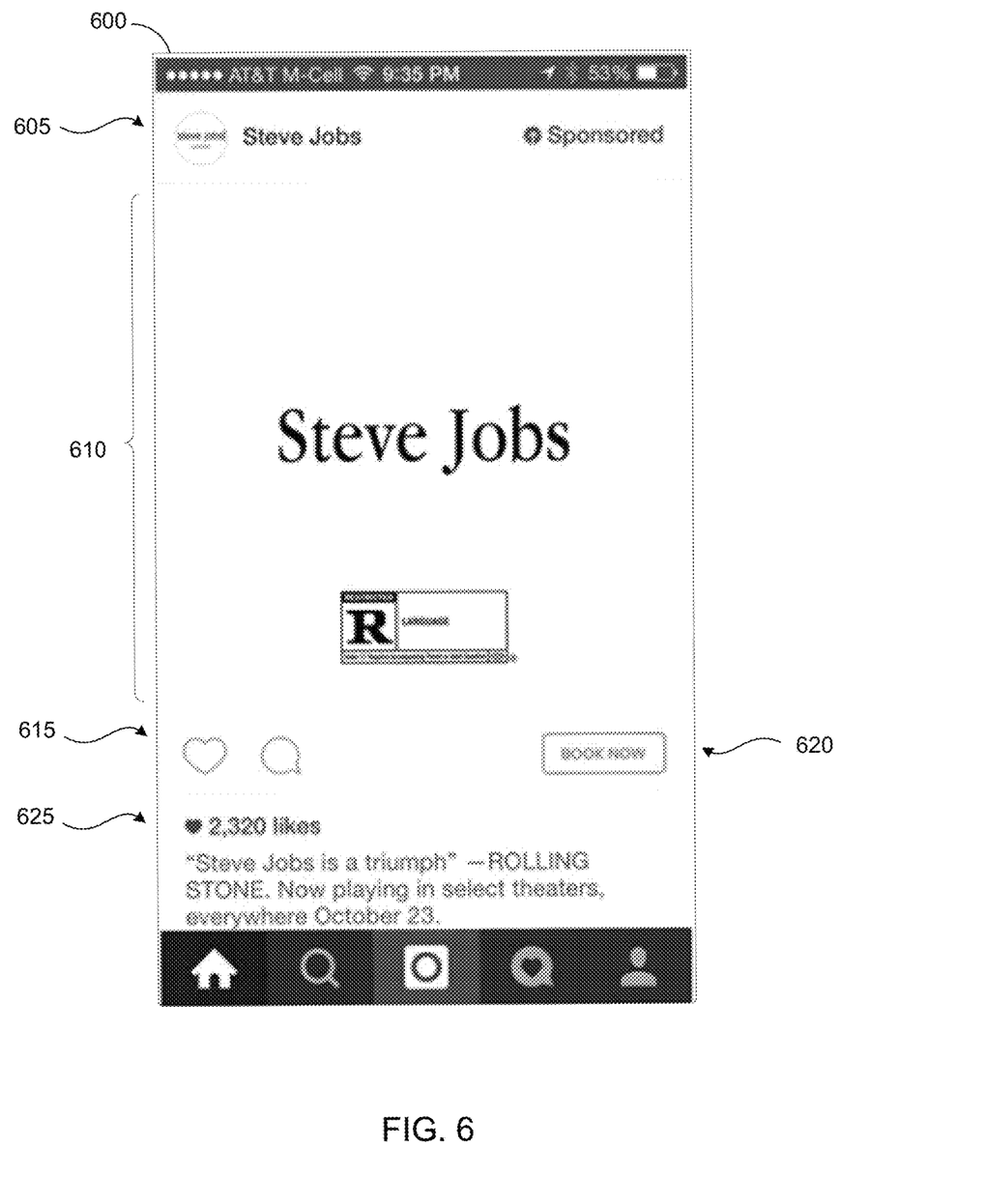
FIG. 6 is an example content item associated with a user generated for presentation in a second online system absent a user account in the second online system, in accordance with an embodiment.

FIGS. 5 and 6 depict examples of content items associated with users, generated for presentation in a second online system 130 with a user account in the second online system (FIG. 5) and a content item associated with a user generated for presentation in the second online system 130 absent a user account in the second online system 130 (FIG. 6). If a requesting user requests to create a content item on the first online system 140 associated with the requesting user for presentation to users of the second online system 130 and the requesting user has a user account in the second online system 130, the content item is generated 325 based on information maintained by the second online system 130 in association with a user account of the requesting user.

The content item may include various elements such as information describing an identity of the requesting user, an object maintained 300 by the first online system 140 that is associated with the requesting user, an option to perform an action on the content item, and a summary of information associated with the content item. In various embodiments, a content item generated with a user account in the second online system 130 contains various elements with functionalities that may be absent in a content item generated 325 for requesting users without a user account in the second online system 130. For example, referring to FIG. 5, the content item 500 may include a hyperlinked logo and/or name of the requesting user 505, such that if a viewing user of the second online system 130 interacts with the hyperlinked logo/name 505, the viewing user is redirected to a page for the requesting user that is maintained by the second online system 130. This functionality may be indicated based on different font styles/colors used for the text of the name 505 of the requesting user or using any other visually distinguishable features. The content item may also include an image or photo associated with the requesting user 510, an option to express a preference for or comment on 515 the content item 500 or to make a purchase 520 associated with the content item 500, a number of users of the second online system 130 that have indicated a preference for the content item 500, and a short description 525 of the content item 500.

In contrast, if a requesting user requests to create a content item on the first online system 140 associated with the requesting user for presentation to users of the second online system 130 and the requesting user does not have a user account in the second online system 130, the content item is generated based on information maintained 300 by the first online system 140 in association with a user account for the requesting user. The content item generated 325 for presentation on the second online system 130 may include various elements that make it similar in appearance to content items associated with users with accounts maintained by the second online system 130.

In various embodiments, a content item 600 generated 325 without a user account in the second online system 130 may be distinguishable (e.g., using different font styles/colors) from content items 500 generated 325 with a user account in the second online system 130 in that the former contains various elements that do not have functionalities that may be present in content items 500 generated 325 for requesting users with a user account in the second online system 130. For example, referring to FIG. 6, similar to the content item 500 in FIG. 5, this content item 600 may also include a logo and/or name 605 of the requesting user. However, unlike the example previously described where a viewing user of the second online system 130 that interacts with the logo/name 505 of the requesting user in the content item is redirected to a page for the requesting user that is maintained by the second online system 130, the viewing user may not be able to interact with the logo/name 605 of the requesting user in a content item 600 that is generated 325 absent an account in the second online system 130. This content item 600 may also include an image or photo 610 associated with the requesting user, an option to express a preference for or comment on 615 the content item 600 or to make a purchase 620 associated with the content item 600, a number of users of the second online system 130 that have indicated a preference for the content item and a short description 625 of the content item 600.

Once communicated to the second online system 130, the first online system 140 may receive information from the second online system 130 describing interactions by one or more users of the second online system 130 with the content item during a time interval and determine a metric describing a performance of the content item that is presented to the requesting user. The first online system 140 tracks information describing interactions with the content items by users of the second online system 130 on which the content items are presented, enabling the requesting user of the first online system 140 to obtain information describing performance of the content item on the second online system 130 or across multiple additional online systems. For example, once the first online system 140 has communicated the content item associated with the requesting user of the first online system 140 for presentation to users of three additional online systems, the first online system 140 may subsequently determine metrics associated with the content item during a time interval specified by the requesting user (e.g., a number of users of one or more of the additional online systems that expressed a preference for the content item, shared the content item, etc.) and present the metrics to the requesting user (e.g., upon request by the requesting user).

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining, at a first online system, user information associated with a plurality of users of the first online system, the user information comprising information describing an identity associated with each user in the first online system;
   receiving a request from a requesting user of the plurality of users of the first online system to generate a content item associated with the requesting user for presentation to users of a second online system;
   in response to determining that the requesting user does not have an account in the second online system, retrieving information describing the identity of the requesting user of the first online system from the user information associated with the requesting user;
   in response to the request, generating the content item comprising the information describing the identity of the requesting user in the first online system; and
   communicating the generated content item comprising the information describing the identity of the requesting user in the first online system to the second online system, without having created an account for the requesting user within the second online system.

2. The method of claim 1, wherein the requesting user is associated with an entity.

3. The method of claim 1, wherein the request from the requesting user of the first online system is received via the second online system.

4. The method of claim 1, wherein the user information associated with a plurality of users of the first online system further comprises one or more permissions, each permission identifying one or more users of the first online system authorized to perform one or more actions associated with a user of the first online system.

5. The method of claim 4, wherein the one or more permissions are associated with one or more objects associated with the user of the first online system maintained by the first online system.

6. The method of claim 4, wherein generating the content item comprising the information describing the identity of the requesting user in the first online system comprises:
   determining whether the requesting user is authorized to create the content item associated with the user of the first online system based at least in part on one or more permissions associated with the requesting user; and
   generating the content item responsive to determining that the requesting user is authorized to create the content item.

7. The method of claim 5, wherein the one or more objects associated with the user of the first online system maintained by the first online system are selected from a group consisting of: a uniform resource locator associated with a system external to the first online system, a page of information, an application, an event, an image, a video, and any combination thereof.

8. The method of claim 1, wherein the user information comprising information describing an identity associated with each user in the first online system is selected from a group consisting of: a name of a user, a profile associated with the user, an image associated with the user, a page associated with the user, login credentials associated with the user, and any combination thereof.

9. The method of claim 1, wherein the content item is generated based at least in part on one or more inputs received from the requesting user.

10. The method of claim 1, further comprising:
    receiving information from the second online system describing interactions by one or more users of the second online system with the content item during a time interval;
    determining a metric describing a performance of the content item, the performance of the content item based at least in part on the received information; and
    presenting the metric to the requesting user.

11. The method of claim 1, further comprising:
    determining that the requesting user does not have an account in the second online system.

12. The method of claim 1, wherein the content item comprises an advertisement associated with the requesting user.

13. A computer program product comprising a non-transitory computer readable storage medium having instructions encoded therein that, when executed by a processor, cause the processor to:

maintain, at a first online system, user information associated with a plurality of users of the first online system, the user information comprising information describing an identity associated with each user in the first online system;

receive a request from a requesting user of the plurality of users of the first online system to generate a content item associated with the requesting user for presentation to users of a second online system;

in response to determining that the requesting user does not have an account in the second online system, retrieve information describing the identity of the requesting user of the first online system from the user information associated with the requesting user;

in response to the request, generate the content item comprising the information describing the identity of the requesting user in the first online system; and     communicate the generated content item comprising the information describing the identity of the requesting user in the first online system to the second on online system, without having created an account for the requesting user within the second online system.

14. The computer program product of claim 13, wherein the requesting user is associated with an entity.

15. The computer program product of claim 13, wherein the request from the requesting user of the first online system is received via the second online system.

16. The computer program product of claim 13, wherein the user information associated with a plurality of users of the first online system further comprises one or more permissions, each permission identifying one or more users of the first online system authorized to perform one or more actions associated with a user of the first online system.

17. The computer program product of claim 16, wherein the one or more permissions are associated with one or more objects associated with the user of the first online system maintained by the first online system.

18. The computer program product of claim 16, wherein generate the content item comprising the information describing the identity of the requesting user in the first online system comprises:

determine whether the requesting user is authorized to create the content item associated with the user of the first online system based at least in part on one or more permissions associated with the requesting user; and     generate the content item responsive to determining that the requesting user is authorized to create the content item.

19. The computer program product of claim 17, wherein the one or more objects associated with the user of the first online system maintained by the first online system are selected from a group consisting of: a uniform resource locator associated with a system external to the first online system, a page of information, an application, an event, an image, a video, and any combination thereof.

20. The computer program product of claim 13, wherein the user information comprising information describing an identity associated with each user in the first online system is selected from a group consisting of: a name of a user, a profile associated with the user, an image associated with the user, a page associated with the user, login credentials associated with the user, and any combination thereof.

21. The computer program product of claim 13, wherein the content item is generated based at least in part on one or more inputs received from the requesting user.

22. The computer program product of claim 13, wherein the computer readable storage medium further has instructions encoded thereon that, when executed by the processor, cause the processor to:

receive information from the second online system describing interactions by one or more users of the second online system with the content item during a time interval;

determine a metric describing a performance of the content item, the performance of the content item based at least in part on the received information; and     present the metric to the requesting user.

23. The computer program product of claim 13, further comprising:

determine that the requesting user does not have an account in the second online system.

24. The computer program product of claim 13, wherein the content item comprises an advertisement associated with the requesting user.

25. A method comprising:

maintaining, at a first online system, user information associated with a plurality of users of the first online system, the user information comprising information describing an identity associated with each user in the first online system and a set of permissions associated with users of the first online system, each permission identifying a set of requesting users of the first online system authorized to perform one or more actions associated with a set of subject users of the first online system;

receiving a request from a requesting user of the plurality of users of the first online system to generate a content item associated with a subject user of the first online system for presentation to users of a second online system, wherein the subject user does not have an account in the second online system;

retrieving information describing the identity of the requesting user and information describing the identity of the subject user from the user information associated with the requesting user and the user information associated with the subject user;

determining whether the requesting user is authorized to create the content item associated with the subject user based at least in part on a set of permissions associated with the requesting user; and     responsive to determining the requesting user is authorized to create the content item associated with the subject user, generating the content item comprising the information describing the identity of the subject user in the first online system; and     communicating the generated content item comprising the information describing the identity of the subject user in the first online system to the second online system, without having created an account for the requesting user within the second online system.

\* \* \* \* \*

UNITED STATES PATENT AND TRADEMARK OFFICE
CERTIFICATE OF CORRECTION

PATENT NO.         : 10,079,794 B2
APPLICATION NO.    : 15/159727
DATED              : September 18, 2018
INVENTOR(S)        : Sanchan Sahai Saxena et al.

Page 1 of 1

It is certified that error appears in the above-identified patent and that said Letters Patent is hereby corrected as shown below:

In the Claims

Column 17, Claim 13, Line 22, after "second", delete "on"

Signed and Sealed this
Ninth Day of July, 2019

Andrei Iancu
*Director of the United States Patent and Trademark Office*